(12) United States Patent
Hashimoto (10) Patent No.: US 8,934,163 B2
(45) Date of Patent: Jan. 13, 2015

(54) LIGHT INTENSITY CONTROL APPARATUS

(71) Applicant: Canon Kabushiki Kaisha, Tokyo (JP)

(72) Inventor: Yoshitaka Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 13/740,635

(22) Filed: Jan. 14, 2013

(65) Prior Publication Data

US 2013/0188236 A1    Jul. 25, 2013

(30) Foreign Application Priority Data

Jan. 20, 2012   (JP) ................................. 2012-009668

(51) Int. Cl.
*G02B 26/02* (2006.01)
*G03B 9/14* (2006.01)

(52) U.S. Cl.
CPC  *G02B 26/02* (2013.01); *G03B 9/14* (2013.01); *G02B 26/023* (2013.01)
USPC .......................................... 359/230; 359/227

(58) Field of Classification Search
CPC ...... G02B 26/00; G02B 26/02; G02B 26/023; G02B 26/04; G02B 26/08; G02B 26/0816; G02B 26/0825; G02B 26/0833; G02B 26/0841
USPC .......................................... 359/230, 232, 233
See application file for complete search history.

(56) References Cited

U.S. PATENT DOCUMENTS

| | | | | |
|---|---|---|---|---|
| 4,319,822 A | * | 3/1982 | Tezuka et al. | 396/464 |
| 5,678,105 A | * | 10/1997 | Hopkins et al. | 396/463 |
| 2003/0062788 A1 | * | 4/2003 | Aoshima | 310/156.32 |
| 2004/0062543 A1 | * | 4/2004 | Miyawaki | 396/463 |

FOREIGN PATENT DOCUMENTS

JP    2007-212645    8/2007

* cited by examiner

*Primary Examiner* — Ricky Mack
*Assistant Examiner* — William Alexander
(74) *Attorney, Agent, or Firm* — Cowan, Liebowitz & Latman, P.C.

(57) ABSTRACT

An arm member is capable of moving to a first position, a second position, a third position, and a fourth position, in order, by driving a stepping motor in one direction. A shutter blade is in a closed state and a light quantity adjustment blade is in an insertion state when the arm member is at the first position, the shutter blade is in an open state and the light quantity adjustment blade is in the insertion state when the arm member is at the second position, the shutter blade is in the open state and the light quantity adjustment blade is in the evacuation state when the arm member is at the third position, and the shutter blade is in the closed state and the light quantity adjustment blade is in the evacuation state when the arm member is at the fourth position.

12 Claims, 12 Drawing Sheets

| | SHUTTER CLOSING OPERATION | | SHUTTER OPENING OPERATION | |
|---|---|---|---|---|
| | FIRST OUTSIDE MAGNETIC POLE PORTION | SECOND OUTSIDE MAGNETIC POLE PORTION | FIRST OUTSIDE MAGNETIC POLE PORTION | SECOND OUTSIDE MAGNETIC POLE PORTION |
| INITIAL PHASE ENERGIZATION | | | N | S |
| DRIVE ENERGIZATION (1) | N | N | | |
| DRIVE ENERGIZATION (2) | N | S | | |
| DRIVE ENERGIZATION (3) | S | S | N | N |

| | SHUTTER CLOSING OPERATION | | SHUTTER OPENING OPERATION | |
|---|---|---|---|---|
| | FIRST OUTSIDE MAGNETIC POLE PORTION | SECOND OUTSIDE MAGNETIC POLE PORTION | FIRST OUTSIDE MAGNETIC POLE PORTION | SECOND OUTSIDE MAGNETIC POLE PORTION |
| INITIAL PHASE ENERGIZATION | S | O | O | N |
| DRIVE ENERGIZATION (1) | S | N | | |
| DRIVE ENERGIZATION (2) | O | N | | |
| DRIVE ENERGIZATION (3) | N | N | | |
| DRIVE ENERGIZATION (4) | | | S | N |
| DRIVE ENERGIZATION (5) | | | S | O |

FIG. 12

LIGHT INTENSITY CONTROL APPARATUS

BACKGROUND OF THE INVENTION

1. Field of the Invention

The present invention relates to a light quantity control apparatus.

2. Description of the Related Art

Conventionally, the light quantity control apparatus having the shutter mechanism and the light quantity adjustment mechanism includes the shutter blade that opens and closes the opening part for the exposure and the light quantity adjustment member that adjusts the quantity adjustment of the opening. And opening and closing of the shutter blade and the movement operation of the light quantity adjustment member are respectively processed by an individual electromagnetic drive source. Further, the shutter blade and the light quantity adjustment member are held at each position where the opening is opened and closed in the non-energized state to each drive source.

However, there are problems that the apparatus costs higher, enlarges and becomes heavy weight, and a consumed power increases since the conventional light quantity control apparatus includes each electromagnetic drive source as a driving source who drives the shutter blade and the light quantity adjustment member.

Then, Japanese Patent Laid-Open No. 2007-212645 proposes the light quantity control apparatus that operates the shutter blade and the light quantity adjustment member with one electromagnetic drive source. The stepping motor is driven at the three positions so as to drive the shutter blade at the three positions by the arm member fixed to the stepping motor, and the aperture blade is provided the allowance formed into the elongate hole so as to drive the shutter blade at the two positions by interlocking with the arm member. By this combination, it is possible to select transferring of the shutter blade into and from the opening part for the exposure or transferring of the aperture blade into and from the opening part for the exposure.

However, there is a problem that the light quantity of the opening part stops for a moment in the prior art disclosed in the Japanese Patent Laid-Open No. 2007-212645 since the shutter blade opens and closes when the aperture blade as the light quantity adjustment member operates opening and closing. Further, there is another problem that the shutter blade collides with the stopper and bounds when the shutter blade closes.

SUMMARY OF THE INVENTION

First object of the present invention is to provide a light quantity control apparatus that drives a shutter blade and a light adjustment member with one electromagnetic drive source and does not shut the light quantity of the opening part by the opening and closing of the shutter blade when the light quantity adjustment member is operated opening and closing. Second object of the present invention is to provide the light quantity control apparatus capable of reducing bound when the shutter blade closes.

A light quantity control apparatus as one aspect of the present invention includes a base plate where an opening part is formed, a shutter blade configured to be movable between a closed state where the shutter blade closes the opening part and an open state where the shutter blade opens the opening part, a light quantity adjustment blade configured to be movable between an insertion state where the light quantity adjustment blade is inserted into the opening part and an evacuation state where the light quantity adjustment blade is evacuated from the opening part, an arm member that engages with the light quantity adjustment blade a link member that is connected with the arm member and engages with the shutter blade, and a stepping motor configured to drive the arm member. The arm member is capable of moving to a first position, a second position, a third position, and a fourth position, in order, by driving the stepping motor in one direction. The shutter blade is in the closed state and the light quantity adjustment blade is in the insertion state when the arm member is at the first position, the shutter blade is in the open state and the light quantity adjustment blade is in the insertion state when the arm member is at the second position, the shutter blade is in the open state and the light quantity adjustment blade is in the evacuation state when the arm member is at the third position, and the shutter blade is in the closed state and the light quantity adjustment blade is in the evacuation state when the arm member is at the fourth position.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
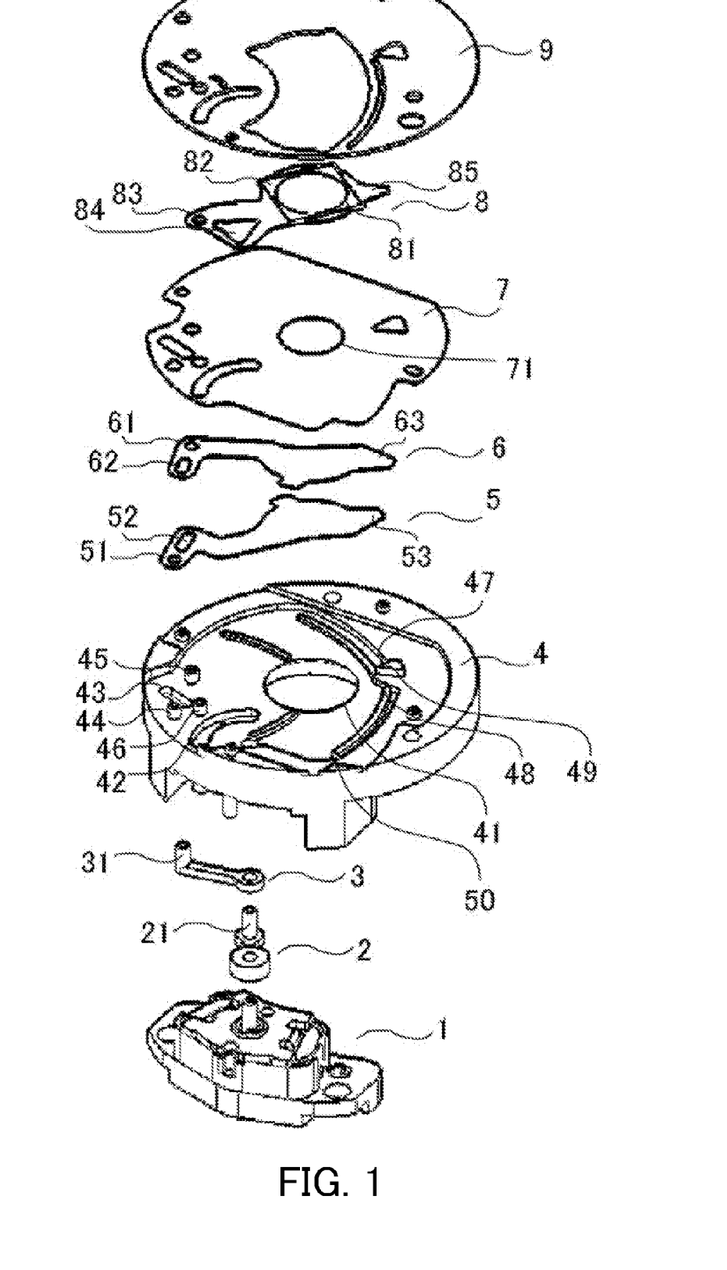
FIG. 1 is an exploded perspective view of a light quantity control apparatus that is one example of the embodiment of a light quantity control apparatus of the present invention.

FIG. 1 is an exploded perspective view of a light quantity control apparatus that is one example of the embodiment of a light quantity control apparatus of the present invention.

A stepping motor 1 is an actuator which is capable controlling so as to stop at least four rotational positions.

An arm member 2 is fixed to an output axis 18 of the stepping motor 1. An output pin 21 is formed on the arm member 2.

A link member 3 is rotatably connected to the output pin 21 of the arm member 2. An output pin 31 as a joint is formed on the link member 3.

An opening part 41 is formed on a base plate 4. The stepping motor 1 is formed on the base plate 4. The output pin 21 of the arm member 2 protrudes into the opposite side where the arm member 2 of the base plate 4 is attached through a hole part 42 formed on the base plate 4. An output pin 31 of the link member 3 protrudes into the opposite side where the link member 3 of the base plate 4 is attached through a guide hole part 43 formed on the base plate 4. Further, an axis dabo 44, an axis dabo 45, an axis dabo 46, a stopper 47, a stopper 48, a stopper 49 and a stopper 50 are formed as a unit in the base plate 4.

A shaft hole 51 and a cam hole 52 are formed on the shutter blade 5. The shutter blade 5 is rotatably supported to the axis dabo 44 by inserting the axis dabo 44 formed on the base plate 4 in the shaft hole 51. As a result, the shutter blade 5 is movably attached to the base plate 4.

A shaft hole 61 and a cam hole 62 are formed on the shutter blade 6. The shutter blade 6 is rotatably supported to the axis dabo 45 by inserting the axis dabo 45 formed on the base plate 4 in the shaft hole 61. As a result, the shutter blade 6 is movably attached to the base plate 4.

The output pin 31 of the link member 3 that protrudes from the guide hole 43 is inserted in the part where the cam hole 52 of the shutter blade 5 overlaps with the cam hole 62 of the shutter blade 6. As a result, the shutter blade 5 and the shutter blade 6 are engaged with the link member 3. When the output pin 31 moves by guiding of the guide hole 43, the shutter blade 5 and the shutter blade 6 are switched the state that opens the opening part 41 and the state that closes the opening part 41. When the shutter blade 5 and the shutter blade 6 close the opening part 41, a protruding portion 53 formed on the shutter blade 5 comes into contact with the stopper 47 and a protruding portion 63 of the shutter blade 6 comes into contact with the stopper 48.

A middle seat 7 is attached to the base plate 4 after the shutter blade 5 and the shutter blade 6 are attached to the base plate 4. Thus, the shutter blade 5 and the shutter blade 6 are arranged between the middle seat 7 and the base plate 4. An opening part 71 is formed at the center of the middle seat 7. The opening size of the opening part 71 is smaller than the opening size of the opening part 41. Therefore, the aperture of the light quantity control apparatus is decided by the opening part 71. The axis dabos 44-46 formed on the base plate 4, the output pin 21 of the arm member 2 and the output pin 31 of the link member 3 protrude from the middle seat 7 when the middle seat 7 is attached to the base plate 4.

An opening part 81 is formed in a ND blade 8 as the light quantity adjustment blade. The opening size of the opening part 81 is larger than the opening size of the opening part 71. AND filter 82 is adhered to the ND blade 8 to cover with the opening part 81. The ND blade 8 is provided with an axis hole 83 and a cam portion 84. The ND blade 8 is rotatably supported to the axis dabo 46 on the middle seat 7 by inserting the axis dabo 46 protruding from the middle seat 7 in the axis hole 83. As a result, the ND blade 8 is movably attached to the base plate 4.

The output pin 21 protruding from the middle seat 7 is inserted in the cam portion 84. As a result, the ND blade 8 is engaged with the arm member 2.

When the output pin 21 traces the inner circumference of the cam portion 84, the ND blade 8 switches the state that the ND filter 82 goes into the opening part 41 and the state that the ND filter 82 evacuates from the opening part 41. A protruding portion 85 formed on the ND blade 8 comes into contact with the stopper 49 when the ND filter 82 goes into the opening part 41, and a protruding portion 85 comes into contact with the stopper 50 when the ND filter 82 evacuates from the opening part 41.

Though ND blade as the light quantity adjustment member is used in this embodiment so as to describe, it is similar that an aperture blade is used.

A shutter block 9 is attached to the base plate 4 after the ND blade 8 is attached to the base plate 4. Thus, the ND blade 8 is arranged between the middle seat 7 and the shutter block 9.

Figure 2:
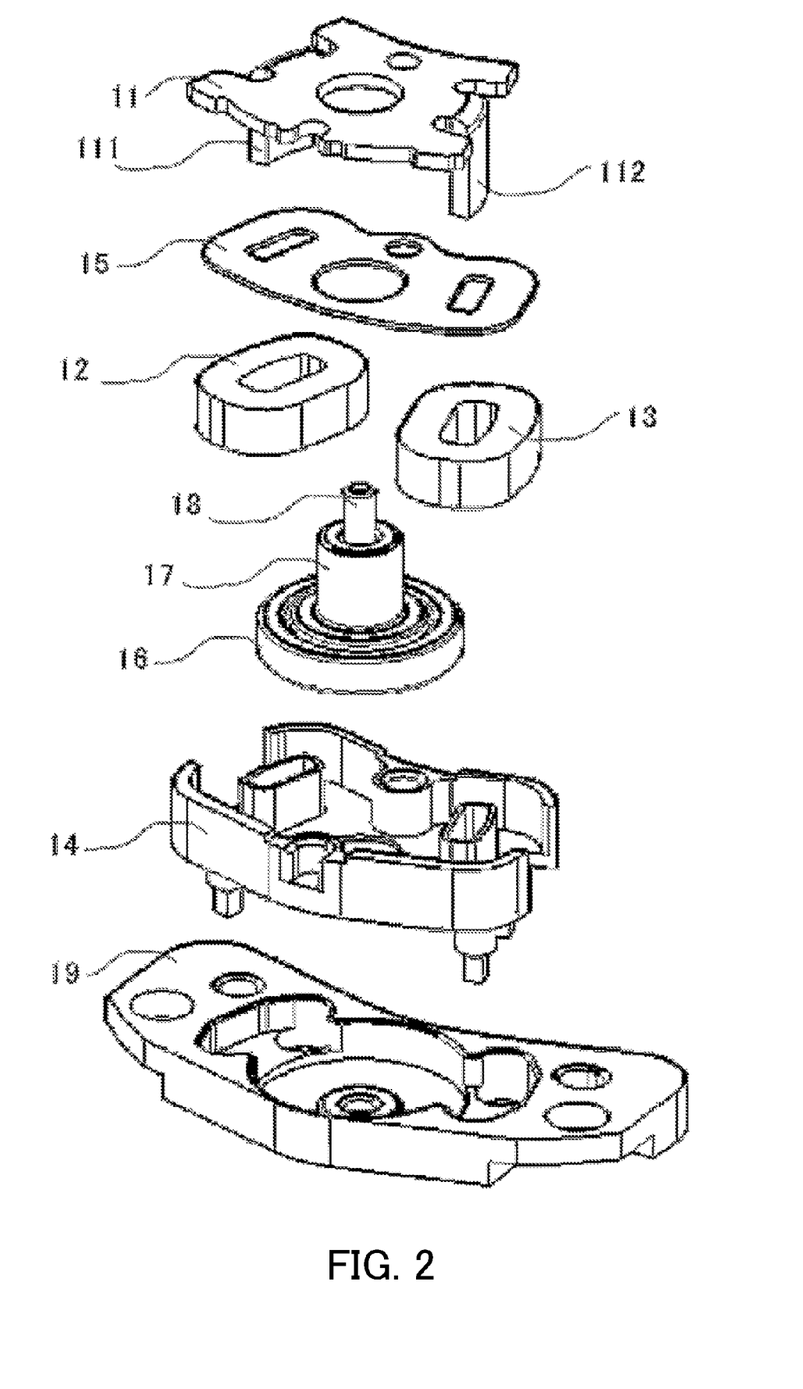
FIG. 2 is an exploded perspective view of a stepping motor.

FIG. 2 is an exploded perspective view of the stepping motor 1.

A stator 11 is formed with the soft magnetic material. A first outside magnetic pole portion 111 and a second outside magnetic pole portion 112 are formed on the stator 11. Further, the first outside magnetic pole portion 111 and the second outside magnetic pole portion 112 are formed in parallel to a rotor axis 17.

A first coil 12 and a second coil 13 are coiled around a bobbin 14. The first outside magnetic pole portion 111 is arranged in the inner circumference of the first coil 12 and the second outside magnetic pole portion 112 is arranged in the inner circumference of the second coil 13. The first outside magnetic pole portion 111 is excited by energizing to the first coil 12 and the second outside magnetic pole portion 112 is excited by energizing to the second coil 13.

A seat material 15 separates the first coil 12, the second coil 13 and the stator 11.

A cylindrically-shaped magnet 16 made of the permanent magnet is divided into six parts in a circumferential direction and is alternately magnetized S pole and N pole. The inner periphery of the magnet 16 has a weak polarization distribution compared with the outer periphery or does not magnetize at all or the pole opposite to the pole of the outer periphery, i.e., if the outer periphery is S pole, its inner periphery is magnetized N pole.

A rotor axis 17 made of the soft magnetic material is fixed to the magnet 16. Thus, a part of the outer periphery of the rotor axis 17 and the inner periphery of the magnet 16 are fixed in close contact with each other by bonding and pressing in. An output axis 18 is formed on the rotor axis 17.

A cover 19 holds the stepping motor 1 and is fixed to the base plate 4.

FIG. 3 is an operation explanatory chart of the stepping motor 1 in embodiment 1.

Figure 3A:
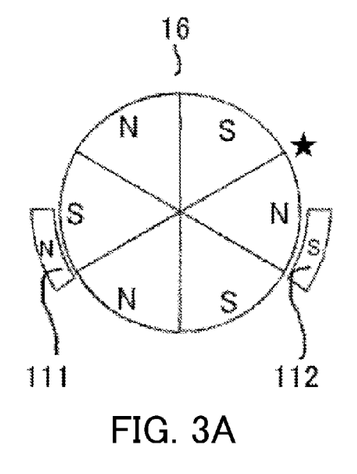
FIGS. 3A-3D are operation explanatory charts of a stepping motor in embodiment 1.
Figure 3B:
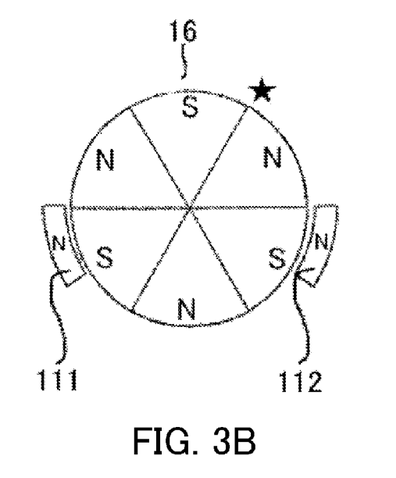
Figure 3C:
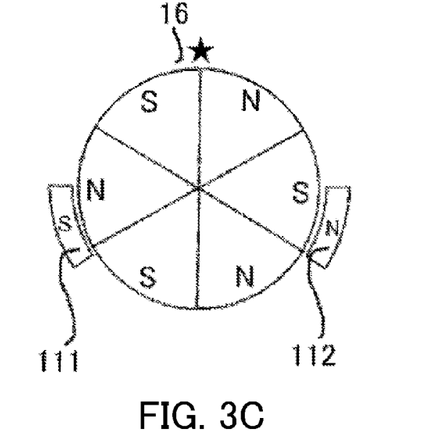
Figure 3D:
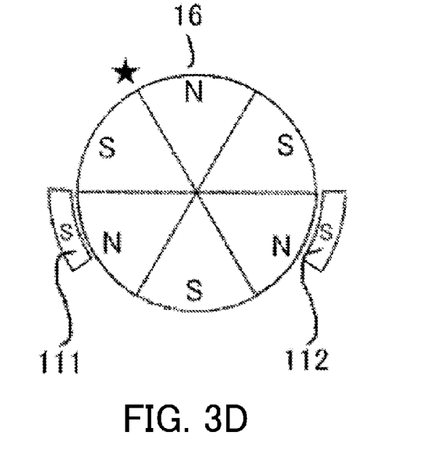

The asterisk is shown at the same position of the magnet 16 to define the movement of the magnet 16. When the first coil 12 is energized so as to make the first outside magnetic pole portion 111 N pole and the second coil 13 is energized to make the second outside magnetic pole portion 112 S pole, the rotational position of the magnet 16 becomes as shown in FIG. 3A. When the energizing direction of the second coil 13 is switched from the state of FIG. 3A, the second outside magnetic pole portion 112 changes into N pole, the magnet 16 rotates 30 degrees in a counterclockwise direction and the rotational position of the magnet 16 becomes as shown in FIG. 3B. Next, when the energizing direction of the first coil 12 is switched from the state of FIG. 3B, the first outside magnetic pole portion 111 changes into S pole, the magnet 16 rotates 30 degrees in a counterclockwise direction and the rotational position of the magnet 16 becomes as shown in FIG. 3C. In addition, when the energizing direction of the second coil 13 is switched from this state of FIG. 3C, the second outside magnetic pole portion 112 changes into S pole, the magnet 16 rotates 30 degrees in a counterclockwise direction and the rotational position of the magnet 16 becomes as shown in FIG. 3D.

In the embodiment, the arm member 2 is movable at a first position, a second position, a third position and a fourth position in order by driving the stepping motor 1 having the above compositions in one direction. Therefore, the arm member 2 is controlled by switching the position of the output pin 21 of the arm member 2 to four different positions apart 30 degrees. Driving area where the arm member 2 is driven to the second position from the first position is defined as a first driving area. Driving area where the arm member 2 is driven to the third position from the second position is defined as a second driving area. Driving area where the arm member 2 is driven to the fourth position from the third position is defined as a third driving area.

FIG. 4 is a figure which shows a position relation between the arm member 2 and the link member 3 and is shown as seen from the underside of FIG. 1. FIG. 4A shows the state that arm member 2 is positioned at the first position. In the state of FIG. 4A, the arm member 2 is positioned at the most counterclockwise side. FIG. 4B shows the state that the arm member 2 is positioned at the second position. The state of FIG. 4B is the state that the stepping motor 1 rotates 30 degrees in a clockwise direction from the state of FIG. 4A. Then, the arm member 2 rotates 30 degrees in a clockwise direction around a rotational axis, the link member 3 connects with the output pin 21 of the arm member 2, and the output pin 21 moves to right along the guide hole 43 of the base plate 4 in FIG. 4 according to the position change of a connection portion that are transmitted drive power. When the stepping motor 1 further rotates 30 degrees in a clockwise direction, the state of FIG. 4B changes the state of FIG. 4C. FIG. 4C shows the state that the arm member 2 is positioned at the third position. In FIG. 4C, though the arm member 2 rotates 30 degrees in a clockwise direction around the rotational axis compared with the state of FIG. 4B, the position of the output pin 31 of the link member 3 does not change compared with the state of FIG. 4B. This is described by using FIG. 5.

Figure 4A:
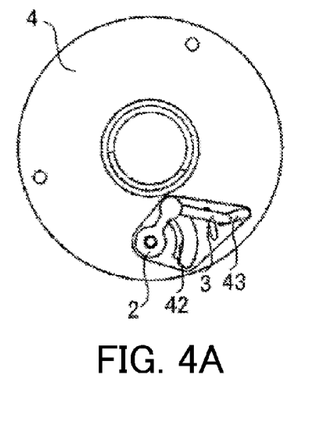
FIGS. 4A-4E are figures that show a position relation between an output pin of an arm member and a link member.
Figure 4B:
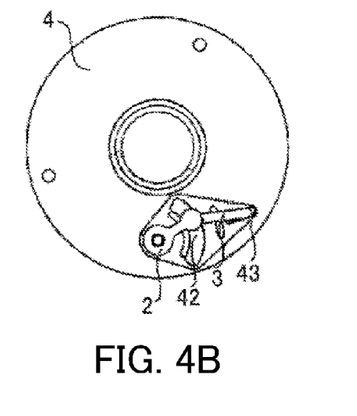
Figure 4C:
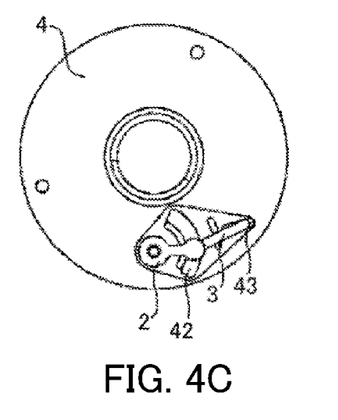
Figure 4D:
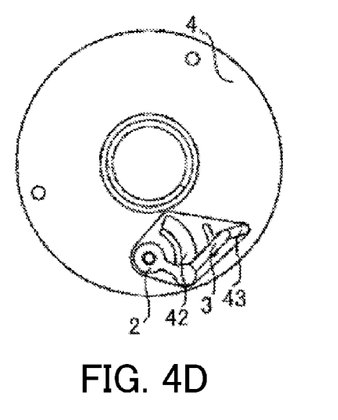
Figure 4E:
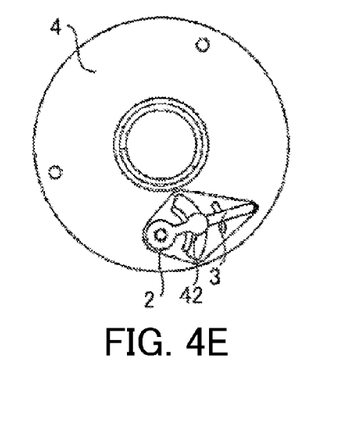
Figure 5:
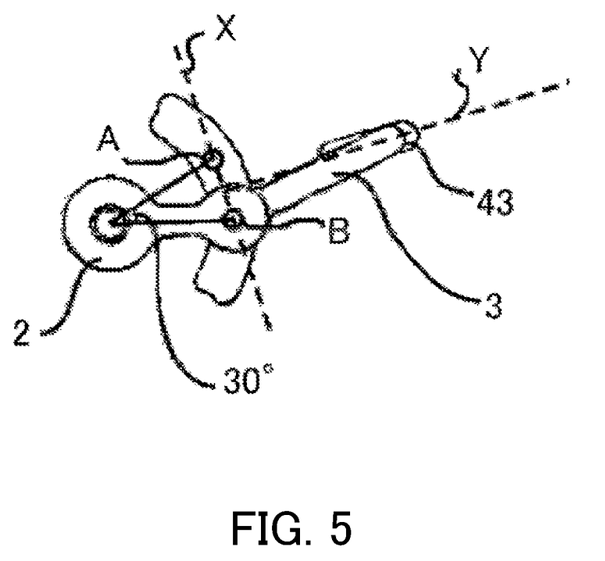
FIG. 5 is a figure that shows a position of an output pin of an arm member in each state of FIG. 4B and FIG. 4C.

FIG. 5 is a figure that shows a position of the output pin 21 of the arm member 2 in each state of FIG. 4B and FIG. 4C. Character A in figure shows the position of the output pin 21 of the arm member 2 in the state of FIG. 4B. Character B in figure shows the position of the output pin 21 of the arm member 2 in the state of FIG. 4C. Dotted line X in figure shows the line that passes on the characters A and B. Dotted line Y in figure is a line that is parallel to the guide hole 43 and passes the center of the output pin 31 of the link member 3. At this time, the dotted line Y is perpendicular to the dotted line X and passes the center of segment A-B, i.e., the dotted line Y is a perpendicular bisector of the segment A-B. As a result, the position of the output pin 31 does not change whether the output pin 21 is positioned at the position of character A or the position of character B. However, a state of FIG. 4E is gone through while the state of FIG. 4B changes the state of FIG. 4C. The output pin 31 of the link member 3 moves to right in FIG. 4 as shown in FIG. 4E while the state of FIG. 4B changes the state of FIG. 4C. FIG. 4D shows a state where the stepping motor 1 further rotates 30 degrees in a clockwise direction from the state of FIG. 4C. FIG. 4D shows the state that the arm member 2 is positioned at the fourth position. In the state of FIG. 4D, the arm member 2 rotates 30 degrees in a clockwise direction around the rotational axis compared with the state of FIG. 4C. The output pin 31 moves to left in FIG. 4 along the guide hole 43 of the base plate 4 according to the position change of the connection portion of the link member 3 that connects to the output pin 21 of the arm member 2.

FIG. 6 is an operation explanatory chart of shutter blades 5 and 6. Each state of FIGS. 6A-6E corresponds to the position of the shutter blades 5 and 6 in each state of FIGS. 4A-4E, respectively. In the state of FIG. 6A, the shutter blade 5 is rotated in a counter clockwise direction around the axis dabo 44 until the protruding portion 53 comes into contact with the stopper 47. At the same time, the shutter blade 6 is rotated until the protruding portion 63 comes into contact with the stopper 48. Under such a condition, the shutter blades 5 and 6 close the opening part 41 of the base plate 4. At this time, the shutter blades 5 and 6 also close the opening part 71 of the middle seat 7. The stepping motor 1 rotates 30 degrees in a counterclockwise direction from the state of FIG. 6A, the state of FIG. 6A changes the state of FIG. 6B. The output pin 31 of the link member 3 moves to right in FIG. 4 along the guide hole 43 of the base plate 4 as described in FIG. 4B. As a result, the output pin 31 is positioned at a position as shown in FIG. 6B, rotates the shutter blade 5 in a counterclockwise direction around the axis dabo 44, and rotates the shutter blade 6 in a clockwise direction around the axis dabo 45. Under such a condition, the shutter blades 5 and 6 open the opening part 41 of the base plate 4. At this time, the shutter blades 5 and 6 also open the opening part 71 of the middle seat 7. The opening size of the light quantity control apparatus is decided by the opening part 71 since the opening size of the opening part 71 is smaller than the opening size of the opening part 41. In addition, the positions of the shutter blades 5 and 6 changes the state of FIG. 6C that is the same as the state of FIG. 6B through the state of FIG. 6E when the stepping motor 1 rotates 30 degrees in a counterclockwise direction from the state of FIG. 6B. As described in FIG. 4C, the position of the output pin 31 of the link member 3 is the same as the position shown in FIG. 6B and positions of the shutter blades 5 and 6 also are the same as the positions of FIG. 6B. The shutter blades 5 and 6 move in a direction where they evacuate from the opening part 41 of the base plate 4 until changing from the state of FIG. 6B into the state of FIG. 6C as shown in FIG. 6E. At this time, the shutter blades 5 and 6 also evacuate from the opening part 71 of the middle seat 7 since the opening size of the opening part 71 is smaller than the opening size of the opening part 41. As a result, the shutter blades 5 and 6 maintain the state where the opening part 41 of the base plate 4 is opened until changing from the state of FIG. 6B into the state of FIG. 6C. The state of FIG. 6C changes the state of FIG. 6D when the stepping motor 1 rotates 30 degrees in a counterclockwise direction from the state of FIG. 6C. As described in FIG. 4D, the output pin 31 of the link member 3 becomes a position shown in FIG. 6D. And the output pin 31 rotates the shutter blade 5 in a counterclockwise direction around the axis dabo 44 and the shutter blade 6 in a clockwise direction around the axis dabo 45 until the protruding portions 53 and 63 come into contact with the stoppers 47 and 48 of the base plate 4, respectively.

Figure 6A:
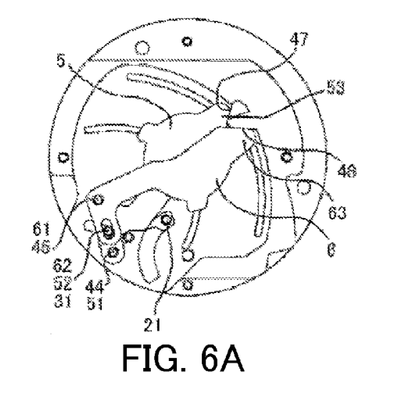
FIGS. 6A-6E are operation explanatory charts of a shutter blade.
Figure 6B:
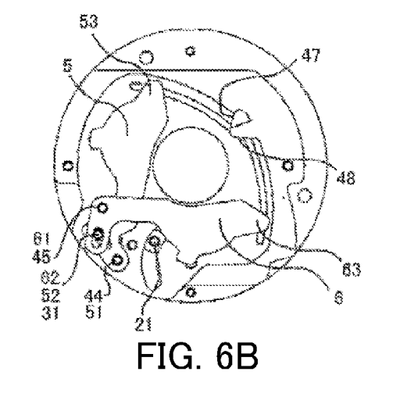
Figures 6C, 6D:
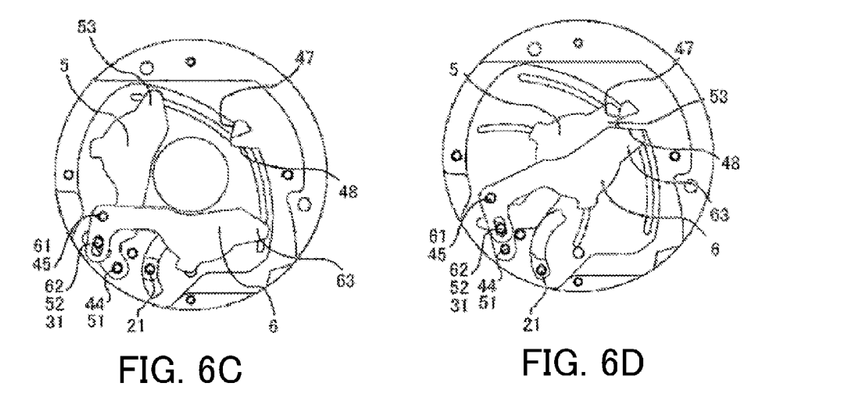
Figure 6E:
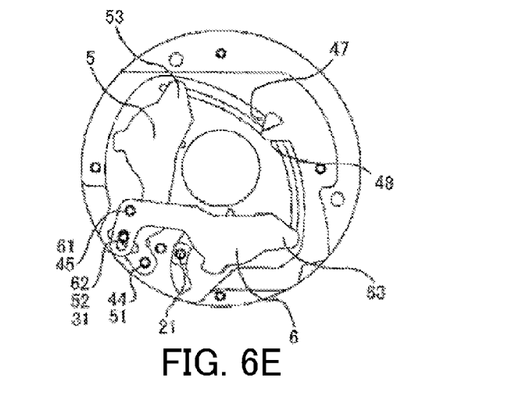
Figure 7A:
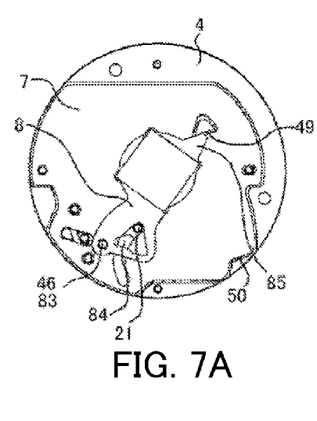
FIGS. 7A-7E are operation explanatory charts of a ND blade.
Figure 7B:
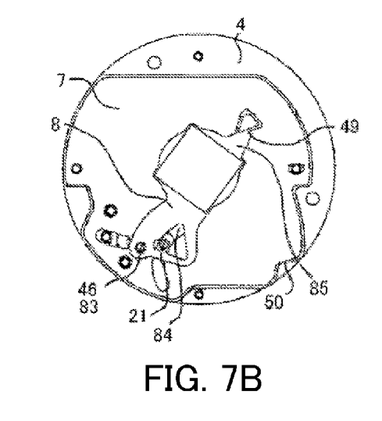
Figure 7C:
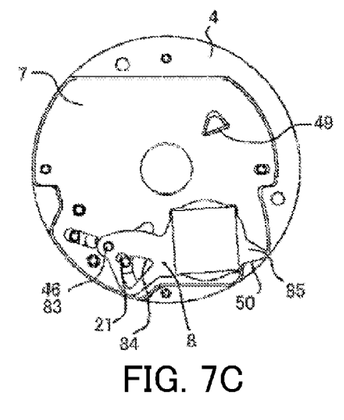
Figure 7D:
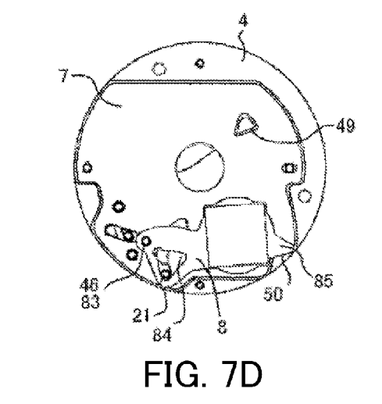
Figure 7E:
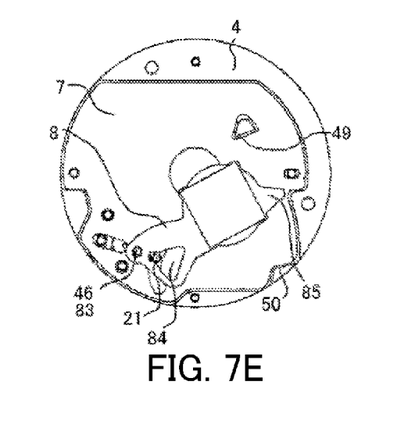

As stated above, the light quantity control apparatus of the present invention opens and closes the shutter by reciprocating between the states of FIGS. 6A and 6B or the states of FIGS. 6C and 6D.

FIG. 7 is an operation explanatory chart of the ND blade 8. Each state of FIGS. 7A-7E corresponds to the position of the ND blade 8 in each state of FIGS. 4A-4E, respectively. In the state of FIG. 7A, the output pin 21 of the arm member 2 is positioned on the edge of the hole part 42 and comes into contact with the inner circumference of the cam portion 84 of the ND blade 8, and the protruding portion 85 of the ND blade 8 comes into contact with the stopper 49 of the base plate 4. Under such a condition, the ND filter 82 goes into the opening part 41. At this time, the ND filter 82 also goes into the opening part 71 of the middle seat 7. FIG. 7B is the state where the stepping motor 1 rotates 30 degrees in a counterclockwise direction from the state of FIG. 7A. Though the output pin 21 of the arm member 2 is positioned on the position of FIG. 7B, the output pin 21 only moves the inside of the cam portion 84 since the cam portion 84 of the ND blade 8 has a shape along the movement locus of the output pin 21 of the arm member 2. Therefore, the position of the ND blade 8 becomes the same position as the state of FIG. 7A. The state of FIG. 7B becomes the state of FIG. 7C through the state of FIG. 7E when the stepping motor 1 rotates 30 degrees in a counterclockwise direction from the state of FIG. 7B. The output pin 21 of the arm member 2 is positioned as shown in FIG. 7C. At this time, the output pin 21 comes into contact the inner circumference of the cam portion 84 of the ND blade 8 and rotates the ND blade 8 in a clockwise direction around the axis dabo 46. Since the protruding portion 85 of the ND blade 8 comes into contact with the stopper 50 of the base plate 4, the ND blade 8 is positioned as shown in FIG. 7C. FIG. 7D is the state where the stepping motor 1 rotates 30 degrees in a counterclockwise direction from the state of FIG. 7C. Though the output pin 21 of the arm member 2 is positioned on the position of FIG. 7D, the output pin 21 only moves the inside of the cam portion 84 since the cam portion 84 of the ND blade 8 has a shape along the movement locus of the output pin 21 of the arm member 2. Therefore, the position of the ND blade 8 becomes the same position as the state of FIG. 7C. The shape of the cam portion 84 is the hole geometry according to the track of the output pin 21 of the arm member 2 in this embodiment, but the shape of the cam portion 84 need not to be the hole geometry and may be a shape that is only larger than the movement locus of the output pin 21 if the axis hole 83 of the ND blade 8 is very large.

As mentioned above, the cam portion 84 of the ND blade 8 has a first area where the ND blade 8 does not move according to the movement of the output pin 21 and a second area where the ND blade 8 moves according to the movement of the output pin 21. The light quantity control apparatus of this embodiment switches the state where the ND filter 82 goes into the opening parts 41 and 71 and the state where the ND filter 82 evacuates from the opening parts 41 and 71 by reciprocating between the state of FIGS. 7B and 7C. And, the ND blade 8 does not move between the states of FIGS. 7A and 7B and the states of FIG. 7C and FIG. 7D.

The shutter blades 5 and 6, and the ND blade 8 move as follows when the movement of the shutter blades 5 and 6, and ND blade 8 in FIGS. 4, 6 and 7 is combined. The stepping motor 1 may be driven so as to reciprocate between the states of B and C of figures when switching the state where the ND filter 82 goes into the opening parts 41 and 71 and the state where the ND filter 82 evacuates from the opening parts 41 and 71. The stepping motor 1 may be driven so as to reciprocate between the states of A and B of figures in switching the state where the shutter blades 5 and 6 open the opening part 41 and 71 and the state where the shutter blades 5 and 6 close the opening parts 41 and 71 when the ND filter 82 goes into the opening parts 41 and 71. When switching in the state that shutter blade 5 and 6 open opening part 41 and 71 with ND filter 82 saved it from opening part 41 and 71 and the closed state, it only has to drive stepping motor 1 to shuttle in the state of C and D of each figure. The stepping motor 1 may be driven so as to reciprocate between the states of C and D of figures in switching the state where the shutter blades 5 and 6 open the opening part 41 and 71 and the state where the shutter blades 5 and 6 close the opening parts 41 and 71 when the ND filter 82 evacuates from the opening parts 41 and 71.

It is possible to drive the shutter blade and the light quantity adjustment material with one electromagnetic drive source, and not to shut the light quantity of the opening part by the opening and closing of the shutter blade when the light quantity adjustment member is operated opening and closing.

Here, when the shutter blades 5 and 6 move from the state as evacuated from the opening parts 41 and 71 of the base blade 4 to the state as covered with them, i.e., the shutter blade closes, the shutter blades 5 and 6 collide with the stoppers 47 and 48. And the shutter blades 5 and 6 receive power in a direction opposite to the movement of the shutter blades 5 and 6 by the impact power. The stepping motor 1 is controlled as follows so that neither shutter blade 5 nor 6 bounds by the impact in the embodiment.

Figure 8:
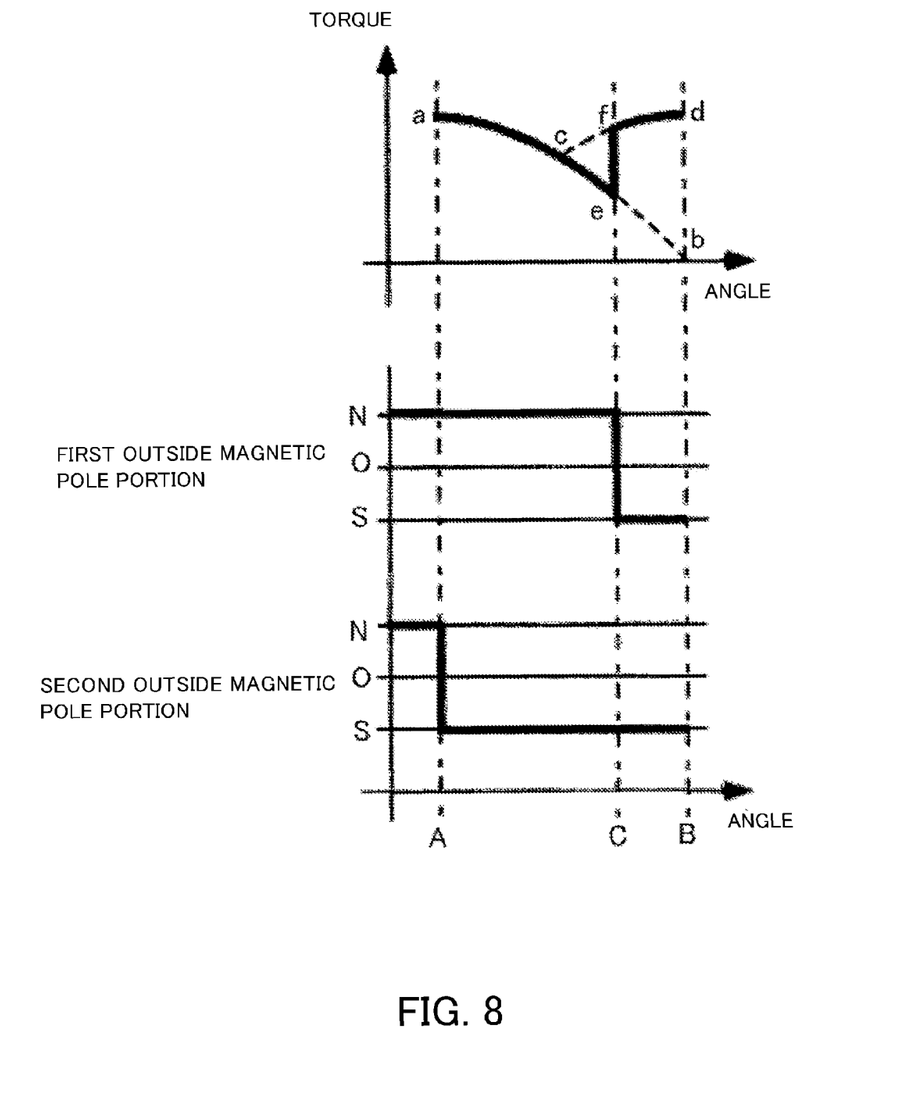
FIG. 8 is a figure where a magnetic pole of an outside magnetic pole portion and a torque are shown when a shutter blade of embodiment 1 closes.

FIG. 8 is a figure where a magnetic pole of an outside magnetic pole portion and a torque are shown when the shutter blades 5 and 6 of the embodiment closes. In FIG. 8, characters A, B and C show the rotational position of the stepping motor 1 respectively, character A is a rotation angle in the state where the shutter blades 5 and 6 open and stop, and character B is a rotation angle degree in the state that the shutter blades 5 and 6 collide with the stopper 47 and 48. Character C is a rotational position between the rotational position A and the rotational position B. In FIG. 8, a longitudinal axis upper direction is a direction where the shutter blades 5 and 6 close in a figure shown the torque and shows a clockwise direction in FIG. 3. The control of the stepping motor 1 according to the embodiment is described by using FIG. 3 and FIG. 8. The state of the stepping motor 1 when the shutter blades 5 and 6 close has the case of movement from the state of FIG. 3B to the state of FIG. 3A and the case of movement from the state of FIG. 3C to the state of FIG. 3D. Here, the case of movement from the state of FIG. 3B to the state of FIG. 3A is described.

In FIG. 8, the stepping motor 1 is the state of the FIG. 3B at the rotational position A, and the shutter blades 5 and 6 opens and stops. When the closing operation of the shutter blades 5 and 6 start, the second outside magnetic pole portion 112 changes into S pole, and the stepping motor 1 is driven in clockwise direction by the torque shown in curve a-b in FIG. 8. Here, the torque is almost 0 at the rotational position B and the shutter blades 5 and 6 bound as mentioned above if the stepping motor 1 drives in a clockwise direction by the torque shown in curve a-b until the stepping motor drives to the rotational position B, i.e., the shutter blades 5 and 6 collide with the stoppers 47 and 48. Then, the stepping motor 1 switches the first outside magnetic pole portion 111 to S pole at the rotational position C that positions on the way to the rotational position B. Then, the torque of the stepping motor 1 becomes curve c-d. Therefore, the torque of the stepping motor 1 changes into point f on curve c-d from point e on curve a-b at the rotational position C, and the stepping motor 1 is driven in a clockwise direction by the torque shown in curve c-d. Under such a condition, even if the stepping motor 1 drives to the rotational position B and the shutter blades 5 and 6 collide with the stoppers 47 and 48, the stepping motor 1 can decrease bounce so that there is a clockwise torque shown in point d. Here, the rotational position C is desirable to position closer to the rotational position where the magnitude correlation of curve a-b and curve c-d changes since the torque is efficiently used and the speed of the shutter improves.

On the other hand, neither the shutter blade 5 nor 6 collides with the stoppers 47 and 48 when the shutter blades 5 and 6 move from the state where the opening part 41 of the base plate 4 and the opening part 71 are closed to the state where the opening part 41 of the base plate 4 and the opening part 71 are opened. Therefore, the second outside magnetic pole portion 112 is only changed from S pole into N pole as mentioned above so as to move from the state of FIG. 3A to the state of FIG. 3B.

Figure 9:
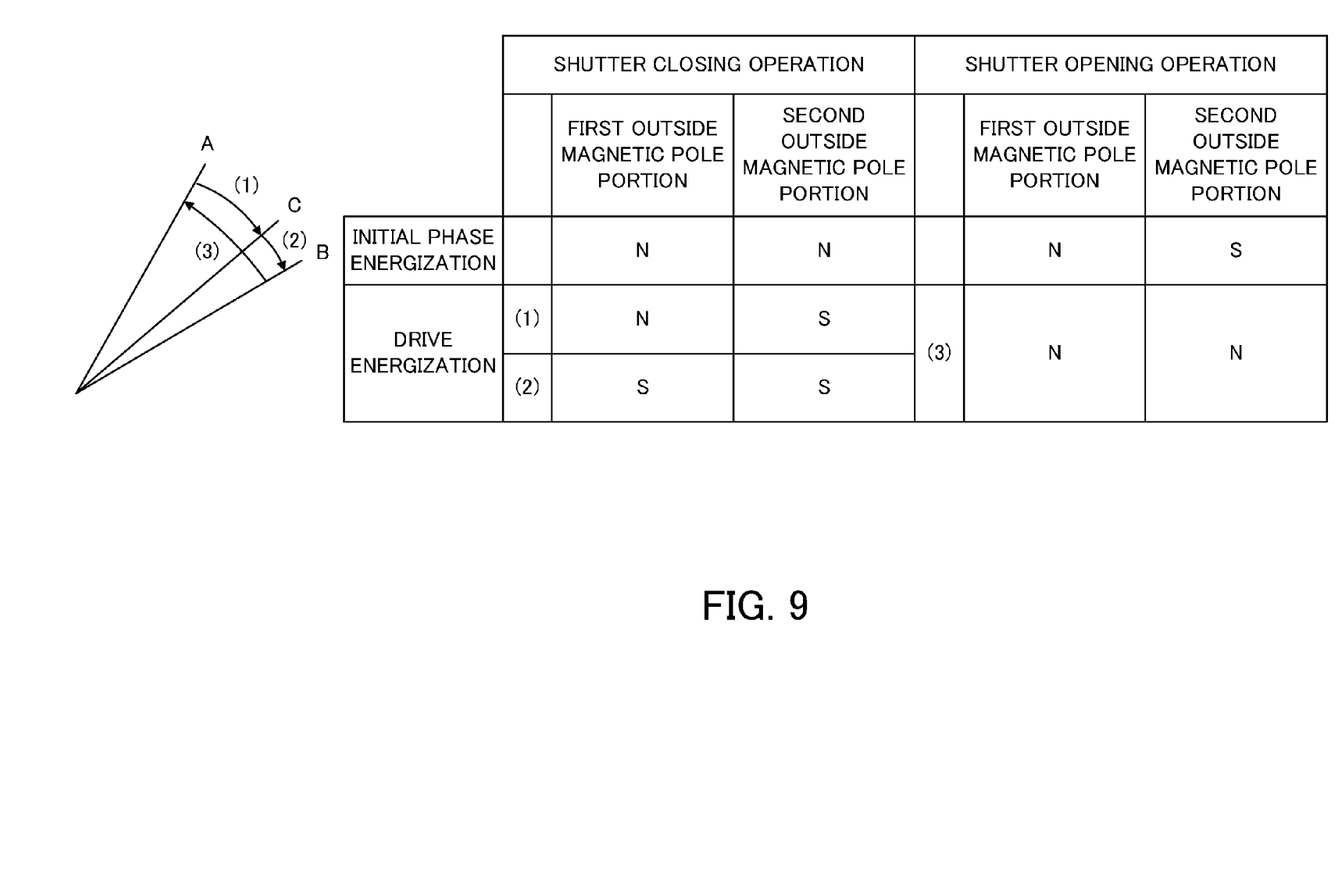
FIG. 9 is a figure where a magnetic pole of an outside magnetic pole portion in each rotational position of a stepping motor in embodiment 1 is summarized.

FIG. 9 is what the above description is compiled. FIG. 9 is a figure where the magnetic pole of the outside magnetic pole portion in each rotational position of the stepping motor 1 in the embodiment is summarized. In FIG. 9, points A-C correspond to the rotational positions A-C in FIG. 8, and when closing the shutter, a region (1) is within a region from the rotational position A to the rotational position C and a region (2) is within a region from the rotational position C to the rotational position B. Further, region (3) is within a region from the rotational positions B to the rotational position A when opening the shutter. The shutter opening operation is operated with one step excluding except the initial phase energization as shown in FIG. 9. On the other hand, the shutter closing operation is operated with two steps which is larger than the shutter opening operation excluding except the initial phase energization.

The explanation about the case that the shutter blades 5 and 6 are closed by the movement of the stepping motor 1 from the state of FIG. 3C to the state of FIG. 3D is omitted since the relation of the outside magnetic pole portion and the rotational direction just reverse.

Embodiment 2

In embodiment 1, the stepping motor 1 energizes both the first coil 12 and the second coil 13 were energized and controls both the first outside magnetic pole portion 111 and the second outside magnetic pole portion 112 magnetic pole portions to became S pole or N pole. In this embodiment, the stepping motor 1 is controlled at the timing when one of the first coil 12 and the second coil 13 of the stepping motor 1 is only energized.

FIG. 10 is an operation explanatory chart of a stepping motor 1 in the embodiment. The asterisk is shown at the same position of the magnet 16 to define the movement of the magnet 16. Character O shown in the first outside magnetic pole portion 111 and the second outside magnetic pole portion 112 in FIG. 10 shows neither the first outside magnetic pole portion 111 nor the second outside magnetic pole portion 112 are S pole and N pole since the first coil 12 and the second coil 13 are not energized. FIG. 10A shows the state that the first coil 12 is not energized and the second coil 13 is energized so that the second outside magnetic pole portion 112 becomes N pole. When the first coil 12 is energized so that the first outside magnetic pole portion 111 becomes S pole from the state of FIG. 10A, the magnet 16 rotates 15 degrees in a counterclockwise direction and the rotational position of the magnet 16 becomes as FIG. 10B. Next, when energization of the second coil 13 is cut from the state of FIG. 10B, the magnet 16 rotates 15 degrees in a counterclockwise direction and the rotational position of the magnet 16 becomes as FIG. 10O. Next, when the second coil 13 is energized from the state of FIG. 10O so that the second outside magnetic pole portion 112 becomes S pole, the magnet 16 rotates 15 degrees in a counterclockwise direction and the rotational position of the magnet 16 becomes as FIG. 10D. Next, when energization of the first coil 12 is cut from the state of FIG. 10D, the magnet 16 rotates 15 degrees in a counterclockwise direction and the rotational position of the magnet 16 becomes as FIG. 10E. Next, when the first coil 12 is energized from the state of FIG. 10E so that the first outside magnetic pole portion 111 becomes N pole, the magnet 16 rotates 15 degrees in a counterclockwise direction and the rotational position of the magnet 16 becomes as FIG. 10F. Next, when energization of the second coil 13 is cut from the state of FIG. 10F, the rotational position of the magnet 16 rotates 15 degrees in a counterclockwise direction and the rotational position becomes as FIG. 10G.

Figure 10A:
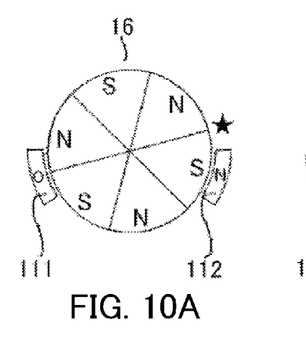
FIGS. 10A-10G are operation explanatory charts of a stepping motor in embodiment 2.

When the stepping motor 1 is at the position of FIG. 10A, the arm member 2 and the link member 3 are at the position of FIG. 4A in the embodiment. And, when the stepping motor 1 is at the position of FIG. 10O, the arm member 2 and the link member 3 are at the position of FIG. 4B. Similarly, when stepping motor 1 is at the position FIG. 10E and FIG. 10G, the arm member 2 and the link member 3 are at the position of FIG. 4C and FIG. 4D. Here, the position of the shutter blades 5 and 6, and the ND blade 8 is decided by the position of the arm member 2 and the link member 3. The explanation about the relation of the position of the shutter blades 5 and 6, and the ND blade 8 to the position of the arm member 2 and the link member 3 since it is similar to embodiment 1.

Figure 10B:
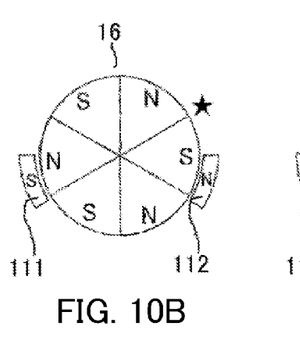
Figure 10C:
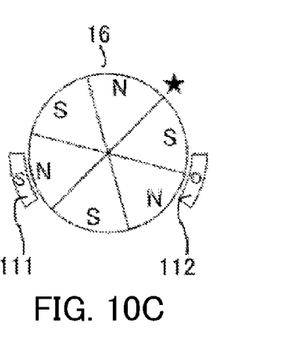
Figure 10D:
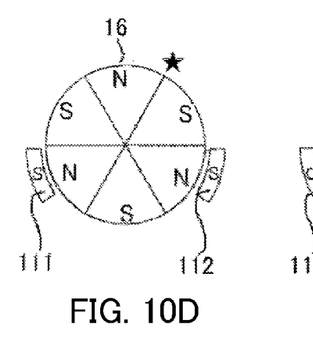

Next, the control of the stepping motor 1 to prevent the bounce when the shutter blades 5 and 6 in the embodiment are closed is described. FIG. 11 is a figure where a magnetic pole of an outside magnetic pole portion and a torque are shown when the shutter blades 5 and 6 in the embodiment close. In FIG. 11, characters A, B, C, and D show the rotational position of the stepping motor 1 respectively, character A is a rotational position in the state where the shutter opens and stops, and character B is a rotational position in the state where the shutter blades 5 and 6 collide with the stoppers 47 and 48. Characters C and D are the rotational positions between the rotational position A and the rotational position B. In FIG. 11, a longitudinal axis upper direction is a direction where the shutter blades 5 and 6 close in a figure shown the torque and shows a clockwise direction in FIG. 10. The control of the stepping motor 1 in the embodiment is described by using FIGS. 10 and 11. The state of the stepping motor 1 when the shutter blades 5 and 6 are closed has the case of movement from the state of FIG. 10O to the state of FIG. 10A through the state of FIG. 10B and the case of movement from the state of FIG. 10E to the state of FIG. 10G through the state of FIG. 10F. Here, the case of movement from the state of FIG. 10C to the state of FIG. 10A through the state of FIG. 10B is described.

In FIG. 11, the stepping motor 1 is in the state of FIG. 10O at angle A and the shutter blades 5 and 6 stops while opening. When the closing operation of the shutter blades 5 and 6 start, the second outside magnetic pole portion 112 changes into N pole and the stepping motor 1 is driven in a clockwise direction by the torque shown in curve a-b in FIG. 11. When the stepping motor 1 rotates until the rotational position C, the state of the stepping motor becomes as FIG. 10B. Next, energization of the first coil 12 of the stepping motor 1 is cut and the first outside magnetic pole portion 111 of the stepping motor 1 is not excited. Then, the stepping motor 1 is driven in a clockwise direction by the torque shown in curve b-c in FIG. 11. Here, the torque is almost 0 in the rotational position B and the bounce is generated as mentioned above if stepping motor 1 drives in a clockwise direction until the rotational position B, i.e., the shutter blades 5 and 6 collide with the stoppers 47 and 48 by the torque shown in curve b-c. Then, the first outside magnetic pole portion 111 is switched to N pole when the stepping motor 1 is at the rotational position D on the way to the rotational position B. At this time, the torque of the stepping motor 1 is shown in curve b-d. Therefore, the torque of the stepping motor 1 changes into point f on curve b-d from point e on curve b-c at the rotational position D, and the stepping motor 1 drives in a clockwise direction by the torque shown in curve f-d. Under such a condition, even if the stepping motor 1 drives to the rotational position B and the shutter blades 5 and 6 collide with the stoppers 47 and 48, the stepping motor 1 can decrease the bounce so that the stepping motor 1 has a clockwise torque shown in point d.

On the other hand, neither the shutter blade 5 nor 6 collide with the stoppers 47 and 48 when the shutter blades 5 and 6 move from the state where they close the opening part 41 to the state where they open the opening part 41 of the base plate 4. Therefore, the stepping motor 1 is driven as follows so as to move the state of FIG. 10A to FIG. 10C. The stepping motor 1 is driven from the state of FIG. 10A where the first outside magnetic pole portion 111 is not excited and the second outside magnetic pole portion 112 is N pole to the state of FIG. 10C where the first outside magnetic pole portion 111 is energized S pole and the second outside magnetic pole portion 112 is not excited.

Figure 11:
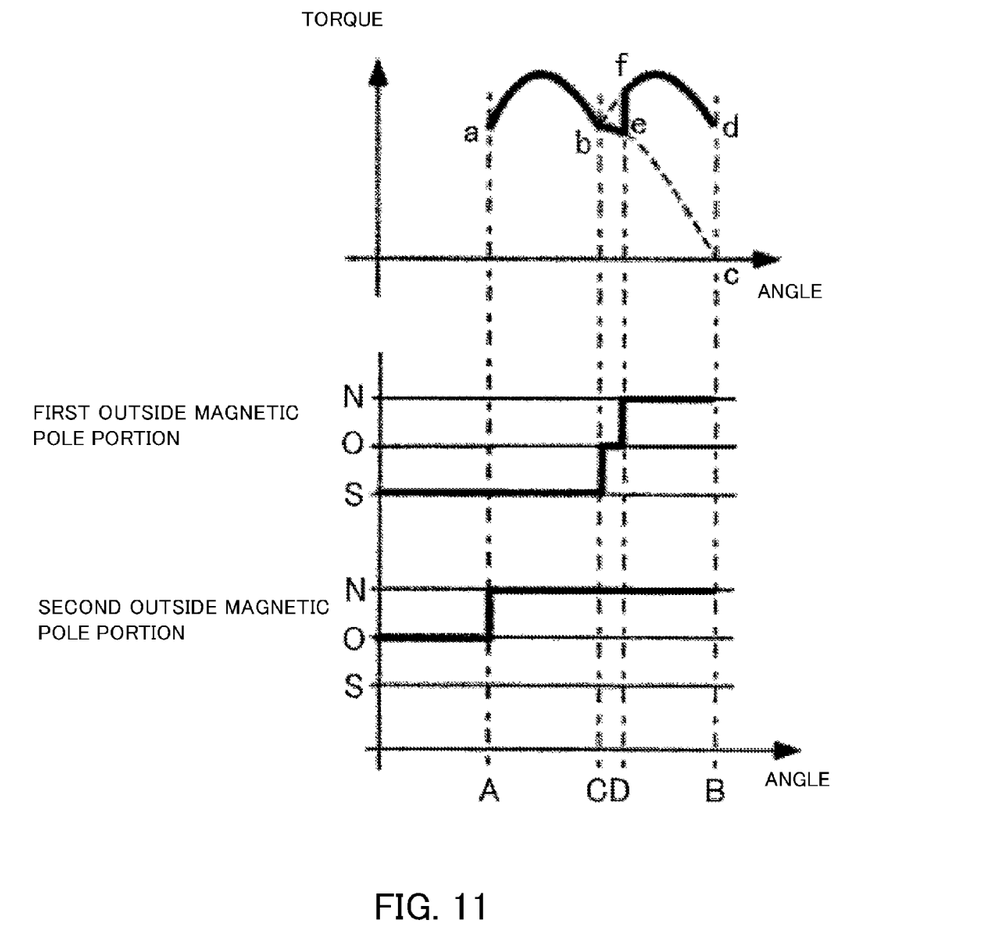
FIG. 11 is a figure where a magnetic pole of an outside magnetic pole portion and a torque are shown when a shutter blade in embodiment 2 closes.
Figure 12:
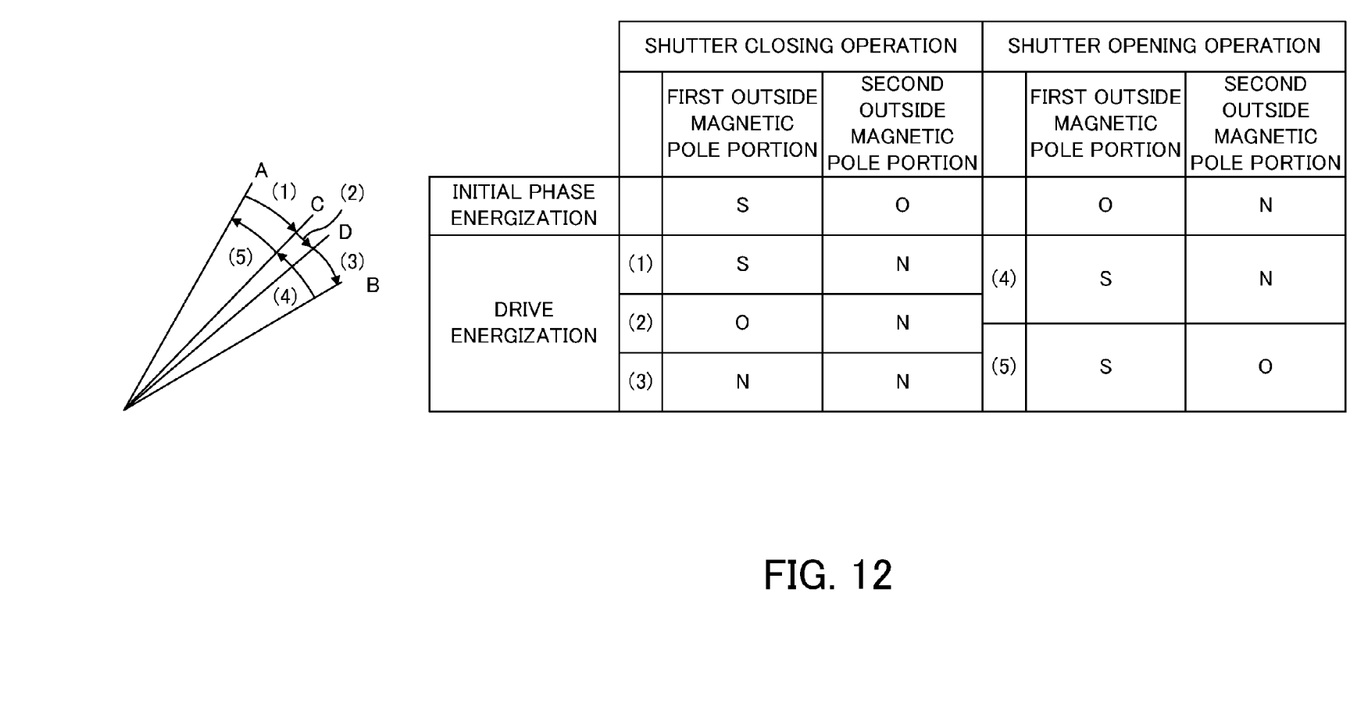
FIG. 12 is a figure where a magnetic pole of an outside magnetic pole portion in each rotational position of a stepping motor in embodiment 2 is summarized.

FIG. 12 is what the above description is compiled. FIG. 12 is a figure where a magnetic pole of an outside magnetic pole portion in each angle of the stepping motor 1 in the embodiment is summarized. In FIG. 12, points A-D correspond to the rotational positions A-D in FIG. 11 respectively, and when closing the shutter blades 5 and 6, a region (1) is within a region from the rotational position A to the rotational position C, a region (2) is within a region from the rotational position C to the rotational position D, and a region (3) is within a region from the rotational position D. Additionally, region (4) is within a region from the rotational position B to the rotational position C and region (5) is within a region from the rotational position C to the rotational position A when opening the shutter blades 5 and 6. As shown in FIG. 12, the shutter blades 5 and 6 are operated at three steps except for an initial phase energization when closing the shutter blades 5 and 6. On the other hand, the shutter blades 5 and 6 are operated at two steps except for an initial phase energization when opening the shutter blades 5 and 6.

Here, the rotational positions C and D can be same. Thus, the region (2) can be omitted. In other words, 2 phase excitation is operated when the shutter blades 5 and 6 close and 1-2 phase excitation is operated when the shutter blades 5 and 6 open.

Figures 10E, 10F:
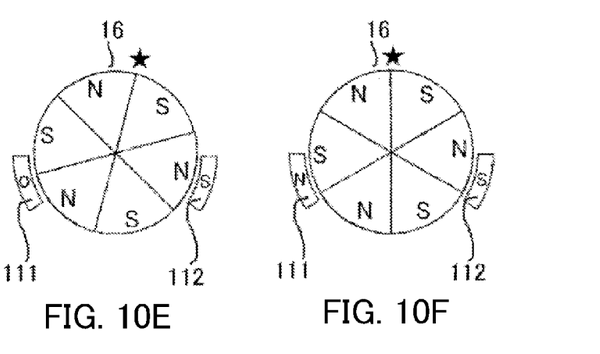
Figure 10G:
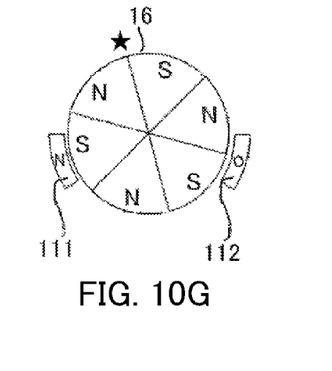

The explanation about the case that the shutter closes by the movement of the stepping motor 1 from the state of FIG. 10E to the state of FIG. 10G is omitted since the relation of the outside magnetic pole portion and the rotational direction just reverse.

Two kinds of drive modes were described about embodiments 1 and 2. The select of the drive mode can be decided whether the stable position of the magnet 16 is a position where both outside magnetic pole portions are S pole or N pole or a position where either outside magnetic pole portion is S pole or N pole when neither the first coil 12 nor the second coil 13 is energized. Moreover, the case that both the first coil 12 and the second coil 13 are energized and the case that either of them is energized can be combined so as to drive by combining embodiments 1 and 2.

Though the position of the shutter blade is limited since the protruding portion of the shutter blade comes into contact with the stopper formed on the base plate in the embodiment, the position of the shutter blade can be limited since the arm member and the link member come into contact with the stopper formed on the base plate.

Further, though the output pin so as to drive the link member and the output pin so as to drive the ND blade are the same, different output pin can drive.

In addition, the shutter blades 5 and 6, and the ND blade 8 are set so as to move according to the rotational angle of the stepping motor 1 in the embodiment. However, if the stepping motor is driven at a smaller rotational angle than a prescribed rotational angle considering angle dispersion of the stepping motor, the stepping motor stably drive since angle dispersion is absorbed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-009668, filed on Jan. 20, 2012, which is hereby incorporated by reference herein in its entirety.

What is claimed is:

1. A light quantity control apparatus comprising:
a base plate where an opening part is formed;
a shutter blade configured to be movable between a closed state where the shutter blade closes the opening part and an open state where the shutter blade opens the opening part;
a light quantity adjustment blade configured to be movable between an insertion state where the light quantity adjustment blade is inserted into the opening part and an evacuation state where the light quantity adjustment blade is evacuated from the opening part;
an arm member that engages with the light quantity adjustment blade;
a link member that is connected with the arm member and engages with the shutter blade; and
a stepping motor configured to drive the arm member,
wherein the arm member is capable of moving to a first position, a second position, a third position, and a fourth position, in order, by driving the stepping motor in one direction,
wherein the shutter blade is in the closed state and the light quantity adjustment blade is in the insertion state when the arm member is at the first position,
wherein the shutter blade is in the open state and the light quantity adjustment blade is in the insertion state when the arm member is at the second position,
wherein the shutter blade is in the open state and the light quantity adjustment blade is in the evacuation state when the arm member is at the third position, and
wherein the shutter blade is in the closed state and the light quantity adjustment blade is in the evacuation state when the arm member is at the fourth position.

2. The light quantity control apparatus according to claim 1,
wherein the light quantity adjustment blade is provided with a shaft hole where a rotational shaft formed on the base plate is inserted and a cam portion where the arm member is inserted, and
wherein the cam portion is provided with a first region where the light quantity adjustment blade does not move according to a movement of the arm member and a second region where the light quantity adjustment blade moves according to the movement of the arm member.

3. The light quantity control apparatus according to claim 1,
wherein the link member is provided with a connection portion that is connected with the arm member and a joint that fits into a guide formed on the base plate, and
wherein the link member moves along the guide according to the movement of the arm member.

4. The light quantity control apparatus according to claim 1, wherein the shutter blade is provided with a shaft hole where a rotational shaft formed on the base plate is inserted and a cam portion where the link member is inserted.

5. The light quantity control apparatus according to claim 1, wherein the arm member and the link member are connected to each other so as to maintain the state where the shutter blade opens the opening part when the arm member moves between the second position and the third position.

6. The light quantity control apparatus according to claim 1, further comprising a controller configured to control the stepping motor,
wherein the base blade is provided with a stopper that comes into contact with the shutter blade when the shutter blade moves so as to close the opening part, and
wherein the controller performs a control so as to drive the stepping motor when moving the shutter blade from the open state to the closed state by a number of steps larger than a number of steps when moving the shutter blade from the closed state to the open state.

7. The light quantity control apparatus according to claim 1, further comprising a controller configured to control the stepping motor,
wherein a stopper that comes into contact with the shutter blade is formed on the base plate when the shutter blade moves the state so as to close the opening part, and
wherein the controller performs a control so as to drive the stepping motor using 2 phase excitation when the shutter blade moves from the state so as to open the opening part to the state so as to close the opening part, and performs a control so as to drive the stepping motor using 1-2 phase excitation when the shutter blade moves from the state so as to close the opening part to the state so as to open the opening part.

8. A light quantity control apparatus comprising:
a driving source;
a base plate where an opening part is formed;
a shutter blade configured to be movable between a closed state where the shutter blade closes the opening part and an open state where the shutter blade opens the opening part;
a light quantity adjustment blade configured to be movable between an insertion state where the light quantity adjustment blade is inserted into the opening part and an evacuation state where the light quantity adjustment blade is evacuated from the opening part;
a transfer mechanism that transfers a drive power by the driving source to the shutter blade and the light quantity adjustment blade,
wherein the transfer mechanism has a first driving region, a second driving region, and a third driving region,
wherein the light quantity adjustment blade does not move from the insertion state and the shutter blade moves from the closed state to the open state when the driving source is driven in a first direction in the first driving region,
wherein the light quantity adjustment blade does not move from the insertion state and the shutter blade moves from the open state to the closed state when the driving source is driven in a second direction opposite to the first direction in the first driving region,
wherein the shutter blade does not move from the open state and the light quantity adjustment blade moves from the insertion state to the evacuation state when the driving source is driven in the first direction in the second driving region,
wherein the shutter blade does not move from the open state and the light quantity adjustment blade moves from the evacuation state to the insertion state when the driving source is driven in the second direction in the second driving region,
wherein the light quantity adjustment blade does not move from the evacuation state and the shutter blade moves from the open state to the closed state when the driving source is driven in the first direction in the third driving region, and
wherein the light quantity adjustment blade does not move from the evacuation state and the shutter blade moves from the closed state to the open state when the driving source is driven in the second direction in the third driving region.

9. The light quantity control apparatus according to claim 8, wherein the transfer mechanism has an arm member that is installed in an output shaft of the driving source and engages with the light quantity adjustment blade and a link member that engages with the shutter blade.

10. The light quantity control apparatus according to claim 9,
wherein the light quantity adjustment blade is provided with a shaft hole where a rotational shaft formed on the base plate is inserted and a cam portion where the arm member is inserted, and
wherein the cam portion is provided with a first cam region where the light quantity adjustment blade does not move according to a movement of the arm member and a second cam region where the light quantity adjustment blade moves according to the movement of the arm member.

11. The light quantity control apparatus according to claim 9,
wherein the link member is provided with a connection portion that is connected with the arm member and a joint that fits into a guide formed on the base plate, and
wherein the link member moves along the guide according to the movement of the arm member.

12. The light quantity control apparatus according to claim 9, wherein the shutter blade is provided with a shaft hole where a rotational shaft formed on the base plate is inserted and a cam portion where the link member is inserted.

* * * * *